(12) United States Patent
Itoh

(10) Patent No.: US 6,488,121 B2
(45) Date of Patent: Dec. 3, 2002

(54) METHOD OF ATOMIZING LUBRICANT AT A CONSTANT RATE IN LUBRICANT ATOMIZER AND CIRCULATING TYPE OF CONSTANT-RATED LUBRICANT ATOMIZER

(75) Inventor: Haruo Itoh, Tokyo (JP)

(73) Assignee: Taco Co., Ltd., Tokyo (JP)

( * ) Notice: Subject to any disclaimer, the term of this patent is extended or adjusted under 35 U.S.C. 154(b) by 9 days.

(21) Appl. No.: 09/752,516

(22) Filed: Jan. 3, 2001

(65) Prior Publication Data

US 2002/0084146 A1 Jul. 4, 2002

(51) Int. Cl.[7] .................................................. F16N 7/34
(52) U.S. Cl. ...................... 184/6.26; 184/55.2
(58) Field of Search ................ 184/6.26, 55.2

(56) References Cited

U.S. PATENT DOCUMENTS 2,890,765 A * 6/1959 Friedell ...................... 184/55.2
3,595,342 A * 7/1971 O'Leary ..................... 184/39.1

FOREIGN PATENT DOCUMENTS

| JP | 10-019192 | 1/1998 | |
| JP | 2580280 | 6/1998 | |
| JP | 2000-241210 | * | 9/2000 |

* cited by examiner

Primary Examiner—Chong H. Kim
(74) Attorney, Agent, or Firm—Rader, Fishman & Grauer PLLC

(57) ABSTRACT

In order to provide method of atomizing lubricant at a constant rate in a lubricant atomizer irrespective of the kinds of lubricant and the working conditions, the lubricant atomizer includes a compressed air valve having two branches on its downstream side, which one of two branches is connected to a Venturi mechanism, and the other branch is connected to a constant lubricant supplying pump. Compressed air is fed from the compressed air valve to the Venturi mechanism and to the constant lubricant-supplying pump, thus drawing the air from a sight dome while the compressed air is flowing in the Venturi mechanism. Lubricant is pumped to the sight dome via a constant lubricant supplying conduit, allowing the lubricant to fall in the center of the Venturi mechanism in the form of droplets. Then, compressed air is mixed with lubricant droplets to form fog of atomized lubricant in the pressurized oil vessel, allowing atomized lubricant to condense into lubricant droplets in the atomized-and-condensed lubricant coexistent space of the pressurized oil vessel, and at the same time allowing the lubricant droplets to fall down on the bottom of the pressurized oil vessel.

6 Claims, 7 Drawing Sheets

FIG.5a
PRIOR ART
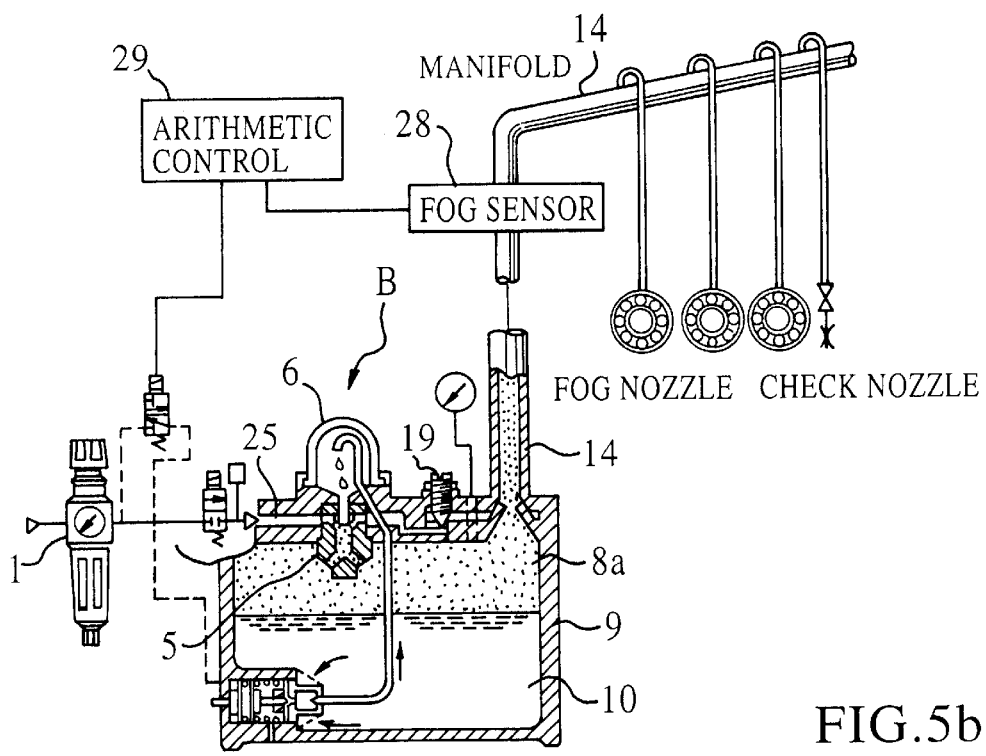
FIG.5b
PRIOR ART
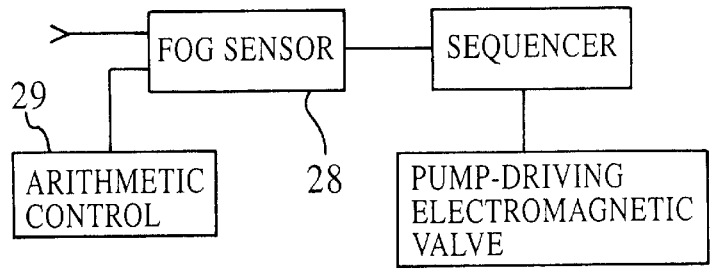
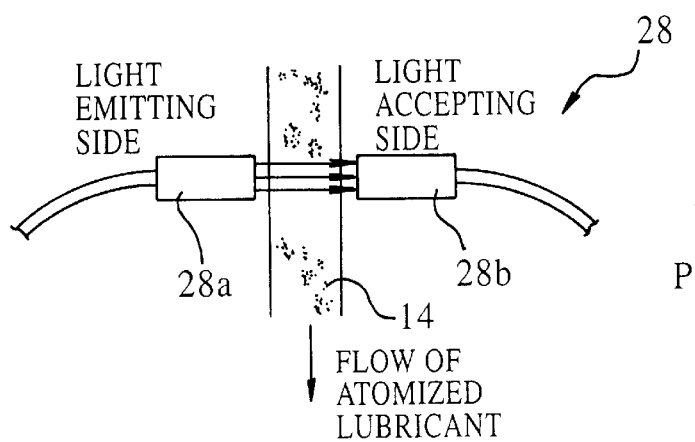
FIG.5c
PRIOR ART Mean particle size and fogging rate of lubricant oil

METHOD OF ATOMIZING LUBRICANT AT A CONSTANT RATE IN LUBRICANT ATOMIZER AND CIRCULATING TYPE OF CONSTANT-RATED LUBRICANT ATOMIZER

BACKGROUND OF THE INVENTION

1. Field of the Invention

The present invention relates to a lubricant atomizer which is capable of atomizing a given lubricant into fog, and directing the lubricant fog to a given object such as bearings, toothed wheels, sliding parts and such like for lubrication. More particularly, the present invention relates to a circulating type of lubricant atomizer which is capable of producing a constant quantity of atomized lubricant per unit time continuously for an elongated period, and a method of producing a constant quantity of atomized lubricant per unit time continuously for an elongated period.

2. Related Arts

Referring to FIG. 3, a conventional lubricant atomizer uses a manifold 21 to convey atomized lubricant to its branch pipes 22. As shown in the drawing, each branch pipe 22 is connected to a ball bearing, a roll bearing, toothed wheels meshed together, a sprocket wheel and a sliding beam. It is necessary that atomized lubricant whose particles are below 2 or less micron meters in diameter be selected and transferred from the atomizer 24 to each feeding point partly because otherwise, atomized lubricant of larger particles is apt to be condensed on the way to the feeding point in the manifold, and partly because atomized lubricant of larger particles cannot be distributed to all branch nozzles as much as required by their sizes. This sort of lubricant atomizer is called "selective type of atomized lubricant distributor".

Referring to FIG. 4, the atomizer 24 works as follows: compressed air is directed to the entrance 25. When passing through the Venturi mechanism 5 (atomizing unit), the compressed air draws the air from the inner space 6a of the sight dome 6 while sucking and raising the lubricant from the lubricant bath 10 of the oil vessel 9 to the inside space 6a of the sight dome 6. Then, the lubricant is allowed to fall down from the inner space 6a of the sight dome 6 to the center of the Venturi mechanism 5 in the form of droplets. Then, the lubricant droplets are carried by the compressed air to be ejected downward. The so ejected atomized lubricant strike against the interference plate 7a, allowing lubricant particles of relatively large size to stick on the interference plate 7a. Finally, the lubricant falls down from the interference plate 7a in the oil vessel 9 in the form of droplets.

After passing through the interference plate 7, the atomized lubricant spreads in the atomized lubricant separating space 8a in the upper part of the oil vessel 9, where lubricant particles of relatively large size are allowed to fall downward while very small lubricant particles floating there are carried by the flow of compressed air to be ejected from the outlet 14a in the form of fog.

Such a selective type of lubricant atomizer, however, has following defects:

1) The fogging rate (the ratio of the quantity of lubricant atomized and ejected from the atomizer to the quantity of lubricant drawn by the siphon tube 27 to be supplied to the Venturi mechanism 5) will vary with different kinds of lubricant even if the air pressure, the air flow rate, the surrounding temperature, the lubricant temperature and other operating conditions remain unchanged (see FIG. 7); this uncertainty may be attributable to different additives such as oiliness improver, oxidative stabilizer, high-pressure additive or anti-foam agent, among which there are some high polymers causing an adverse effect on the atomizing of lubricant; and to the possibility of arbitrarily changing additives in the lubricants which are sold under same trade names, without informing purchasers of such change. The fogging rate of new lubricants, therefore, needs to be determined prior to use, and the fogging rate of familiar lubricants needs to be checked from time to time.

2) The fogging rate will be affected by the time-variable operating conditions such as the lubricant feeding pressure, the quantity of air flowing from the air bypass into the lubricant conveying line, the daily or seasonal change of surrounding temperature and other factors which are liable to change after the atomizer has been working a certain length of time while using one and same lubricant.

3) The fogging rate will be affected by the deterioration of mechanical parts of the atomizer after elongated use as for instance follows: the Venturi mechanism is apt to be contaminated with dust or oil vapor contained in compressed air; and the lubricant nozzles are apt to be clogged.

4) These defects lead to the difficulty in controlling the absolute quantity of lubricant per unit time, which is contained in the fog ejected from the atomizer. The constant feeding pump positioned in the lubricant feeding line can supply a constant quantity of lubricant to the sight dome of the atomizer, but the varying of the fogging rate will cause the quantity of lubricant from the constant feeding pump to vary accordingly. The absolute quantity of lubricant per unit time ejected from the atomizer can be measured in terms of the descending of the surface level of the lubricant bath. As a matter of fact, however, the descending rate per unit time is so small that a significant measurement requires an elongated time involved therefor.

In the hope of solving such problems, Japanese Patent 10-19192(A) and Utility Model 2580280(B) proposed improved atomizers which are capable of atomizing a controlled quantity of lubricant per unit time.

As shown in FIGS. 5a, 5b and 5c, the former lubricant atomizer uses a lubricant fog sensor 28, which is positioned in the lubricant feeding line 14 to detect changes, if any in the working factors (the lubricant feeding pressure, the quantity of air added to the lubricant feeding line from the air bypass, or the surrounding temperature) and in the fogging rate and the fog density in the lubricant feeding line 14, thereby permitting the controlling of the quantity of lubricant to be supplied to the Venturi mechanism 5 for keeping the fog density unchanged.

As shown in FIG. 6, the latter lubricant atomizer comprises a top sight dome 6 for watching the falling of lubricant droplets, a Venturi mechanism 5 having an air feeding line 25 connected thereto, and a pressurized vessel 8. The Venturi mechanism 5 has an interference 7 formed on its ejecting side, thereby allowing the fog to strike against the interference 7. Impingement at the interference 7 grows relatively large fog particles to large droplets, which fall downward. Solid contaminant in the oil functions as a core of fog particle at the atomizing process and check oil to form the fine fog. Relatively large fog particles containing solid contaminants also fall down on the bottom of the pressurized vessel 8. The lubricant thus collected on the bottom of the pressurized vessel 8 contains a significant amount of dust, and therefore, such contaminated lubricant oil is difficult to be atomized. The lubricant oil remaining on the bottom of the pressurized vessel 8 is filtered with passing through the filter 11, and the filtrate is drawn by the sucking pump 26 to return to the oil vessel 9. Thus, the fogging rate is stabilized.

As for the lubricant atomizer disclosed in Japanese Patent 10-19192(A), the lubricant fog sensor 28 and the arithmetic control (FIG. 5*b*) are inhibitably expensive, and therefore its use is limited to extra need.

As for the lubricant atomizer disclosed in Japanese Utility Model 2580280(B), the lubricant is fed at a constant rate by using a constant feeding pump 12. Contaminant is removed from compressed air and lubricant oil, thereby providing very small particles of lubricant in the fog. Thus, the fogging rate is improved, and at the same time, the fogging rate is stabilized. The proposed lubricant atomizer, however, cannot solve all of the problems 1, 2, 3 and 4 described above.

In view of the above, one object of the present invention is to provide a method of atomizing lubricant at a constant rate in a lubricant atomizer irrespective of the kinds of lubricant and the working conditions. Another object of the present invention is to provide a circulating type of constant-rated lubricant atomizer which is less expensive, and is capable of atomizing lubricant at a constant rate irrespective of the kinds of lubricant and the working conditions.

SUMMARY OF THE INVENTION

To attain these objects a method of atomizing lubricant at a constant rate in a lubricant atomizer comprising a compressed air valve having two or more ports and two branches on its downstream side, a sight dome, a pressurized oil vessel integrally connected to the sight dome with an intervening Venturi mechanism fixed therebetween, and a constant lubricant supplying pump, one of the two branches of the compressed air valve being connected to the Venturi mechanism, and the other branch being connected to the constant lubricant supplying pump, the method comprising the steps of; supplying filtrated, pressure-controlled compressed air to the Venturi mechanism via one of the two branches of the compressed air valve and to the constant lubricant supplying pump via the other branch of the compressed air valve respectively, thus drawing the air from the sight dome while the compressed air is flowing in the Venturi mechanism; supplying lubricant from the constant lubricant supplying pump to the sight dome via an associated constant lubricant supplying conduit, allowing the lubricant to fall in the center of the Venturi mechanism in the form of droplets; mixing compressed air with lubricant droplets to form the fog of atomized lubricant in the pressurized oil vessel; allowing atomized lubricant to condense into lubricant droplets in the atomized-and-condensed lubricant coexistent space of the pressurized oil vessel; and allowing the lubricant droplets to fall down on the bottom of the pressurized oil vessel while ejecting the fog of atomized lubricant from the pressurized oil vessel, is improved according to the present invention in that it further comprises the step of using the negative pressure provided by the Venturi mechanism to draw the lubricant remaining on the bottom of the pressurized oil vessel via an associated lubricant circulating conduit opening at the bottom of the pressurized oil vessel, thereby making lubricant to return to the lubricant fed-back space defined above the Venturi mechanism, thus permitting lubricant to be atomized continuously.

Lubricant may be drawn from the bottom of the oil vessel via an associated filter after putting the plunger pump in operation by actuating an associated three-port electromagnetic valve, via which the compressed air is supplied from the other branch of the compressed air valve to the plunger pump; the Venturi mechanism may comprise a Venturi body and an associated holder; a predetermined quantity of lubricant may be supplied to the sight dome via the constant lubricant supplying conduit; the lubricant fed-back space may be defined above the Venturi body in the Venturi holder, the Venturi holder having at least one through hole to allow lubricant to drop from the sight dome to the lubricant fed-back space; and the lubricant fed back to the lubricant fed-back space may be joined with the lubricant falling down in the lubricant fed-back space.

A circulating type of constant-rated lubricant atomizer according to the present invention comprises: an on-and-off compressed air valve having two or more ports and two branches on its downstream side, a sight dome, a pressurized oil vessel integrally connected to the sight dome with an intervening Venturi mechanism fixed therebetween, a constant lubricant oil supplying pump, one of the two branches of the compressed air valve being connected to the Venturi mechanism, and the other branch being connected to the constant lubricant oil supplying pump, and a lubricant circulating conduit opening at the bottom of the pressurized oil vessel, thereby making lubricant to return to the Venturi mechanism, thus permitting lubricant oil to be atomized continuously.

The Venturi mechanism may comprise a Venturi body and an associated Venturi holder having one or more through holes; a lubricant fed-back space may be defined above the Venturi body in the Venturi holder so that the lubricant fed-back space communicates with the sight dome via the through hole, and the lubricant circulating conduit may be connected to the lubricant fed-back space via a passage formed at a level higher than the Venturi body.

The constant lubricant oil supplying pump may comprise a plunger pump communicating with an oil vessel, and a three-ported electromagnetic valve connected to the on-and-off compressed air valve, thus permitting the plunger pump to work through the on-and-off operation of the electromagnetic valve, thereby drawing a predetermined quantity of lubricant from the oil vessel after being filtered by a lubricant filter provided in the oil vessel so that the sight dome may be supplied with the predetermined quantity of lubricant via the constant lubricant supplying conduit.

The pressurized oil vessel may have a level switch and/or lubricant drain valve equipped therewith.

Other objects and advantages of the present invention will be understood from the following description of one preferred embodiment of the present invention, which is shown in accompanying drawings.

BRIEF DESCRIPTION OF THE DRAWING

FIG. 5 illustrates still another conventional lubricant atomizer;

DETAILED DESCRIPTION OF PREFERRED EMBODIMENT

Figure 1:
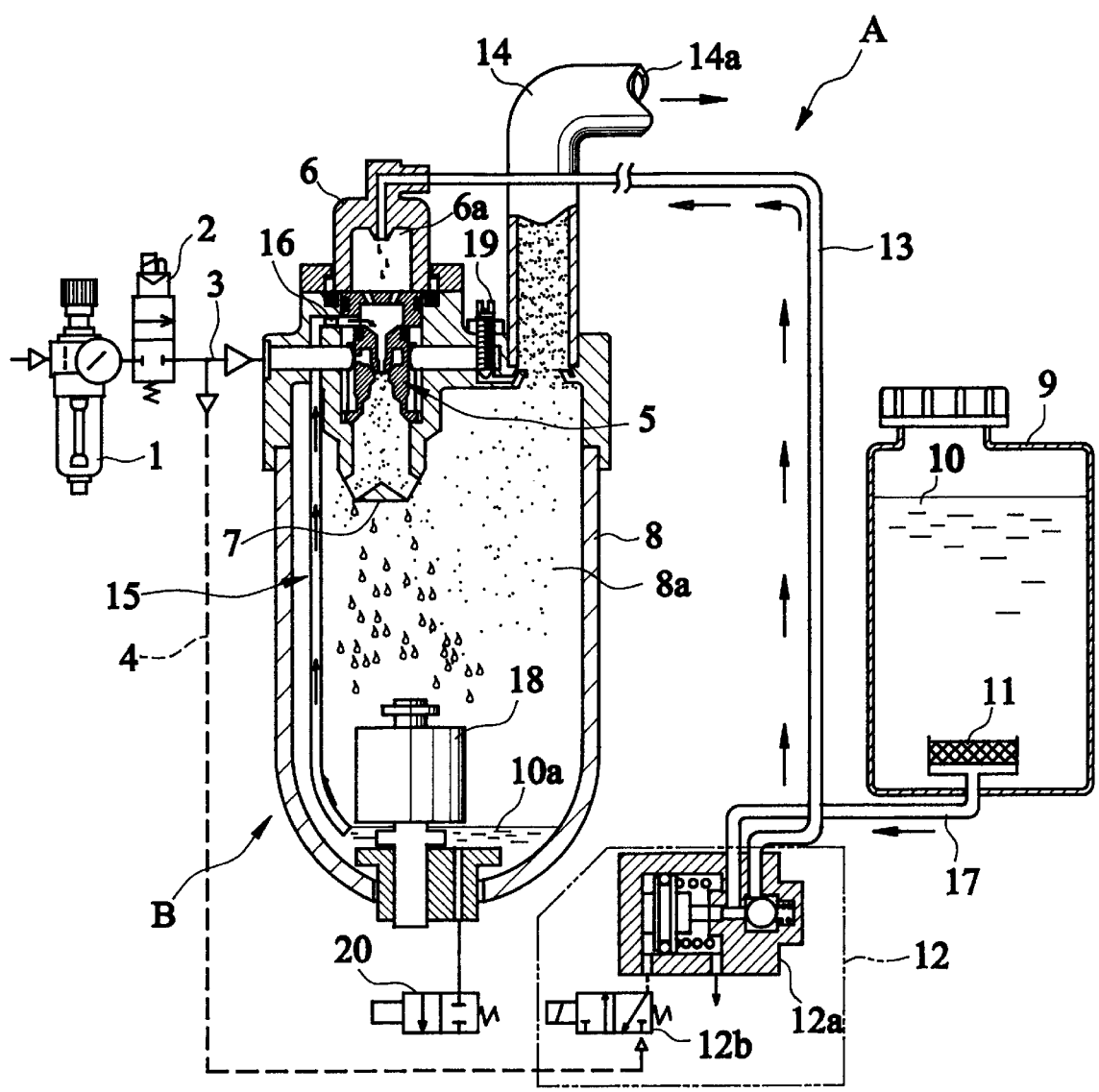
FIG. 1 illustrates a circulating type of constant-rated lubricant atomizer according to the present invention.
Figure 2:
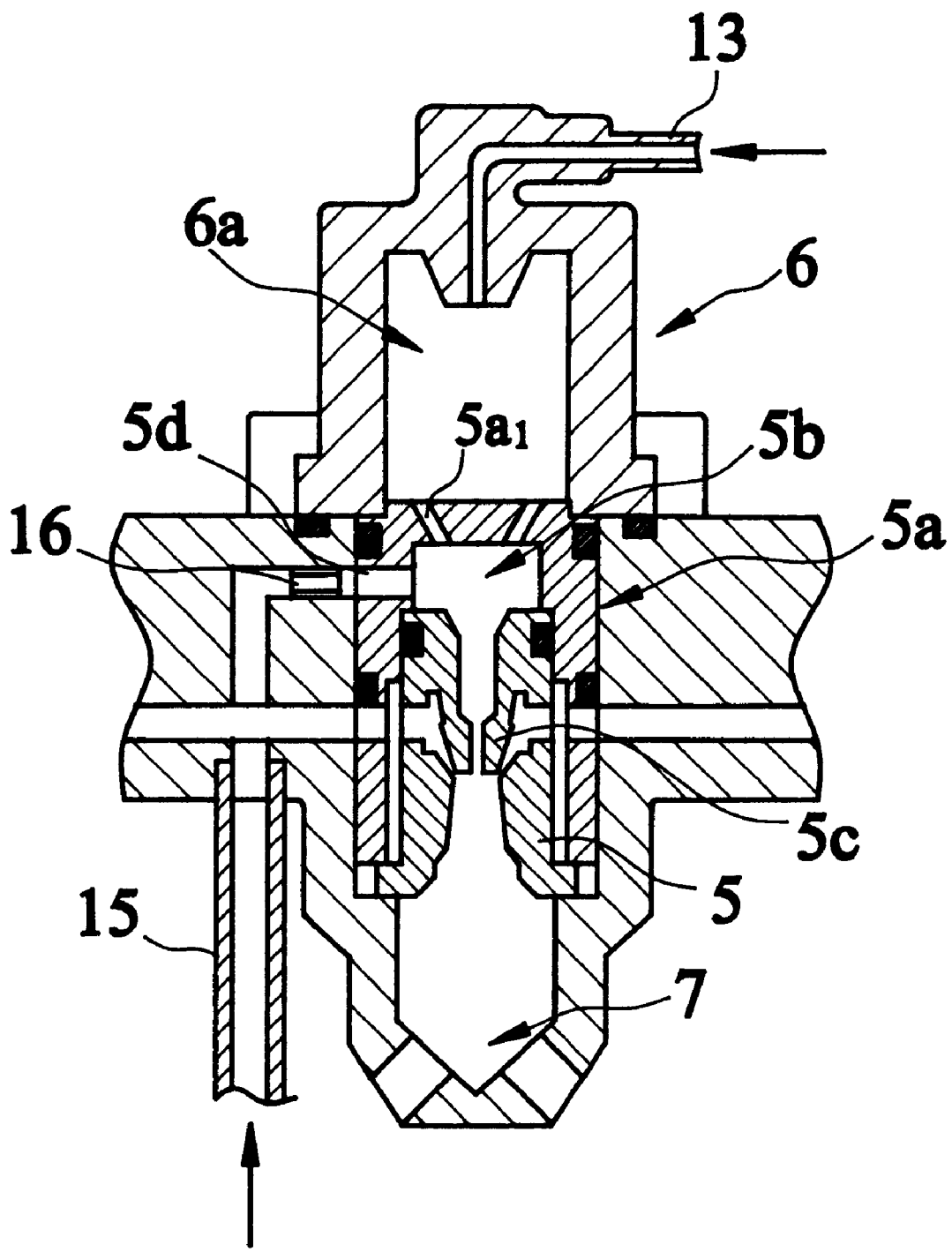
FIG. 2 is an enlarged sectional view showing the Venturi mechanism of the atomizer of FIG. 1.
Figure 3:
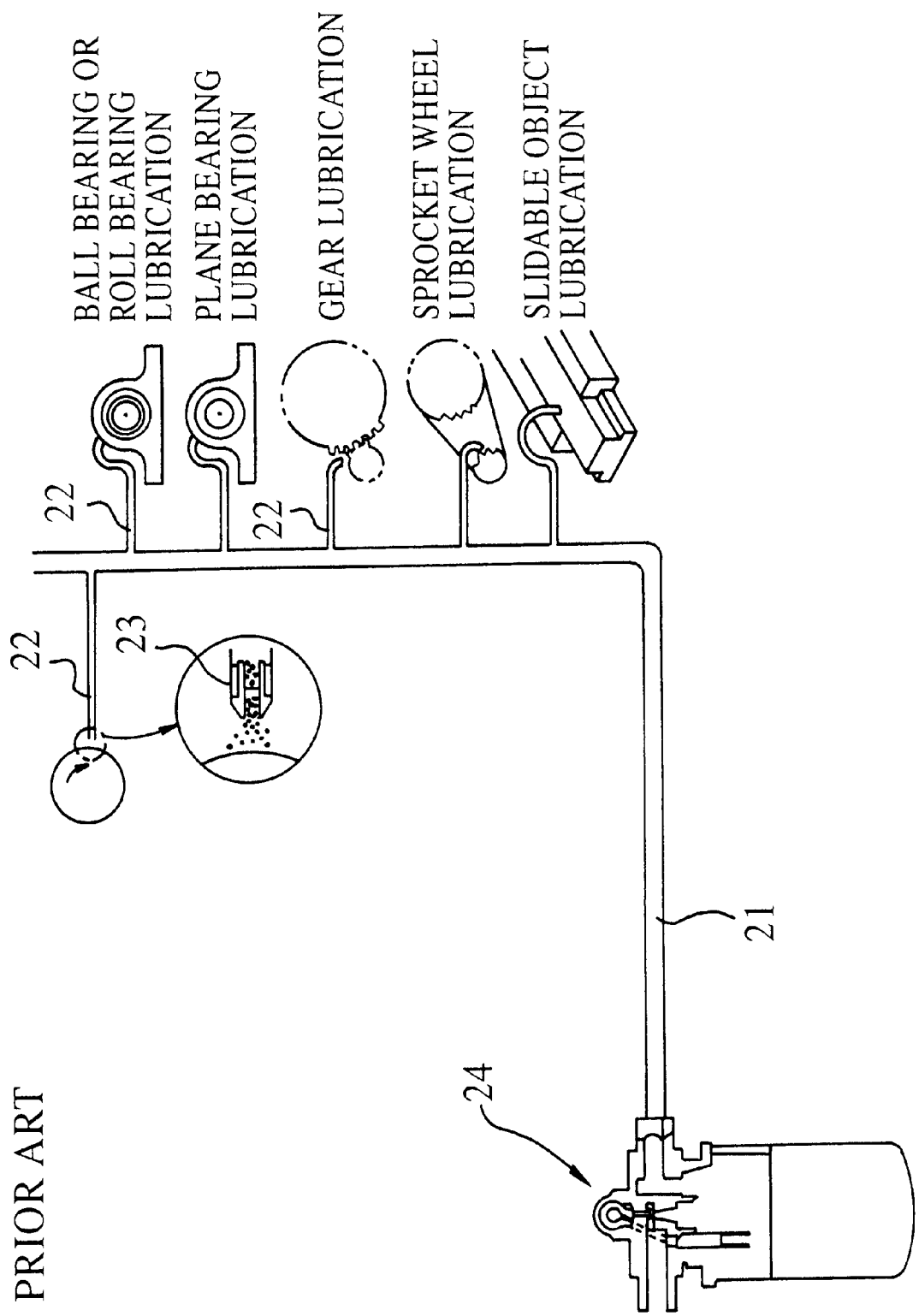
FIG. 3 illustrates a conventional selective type of lubricant atomizer.
Figure 4:
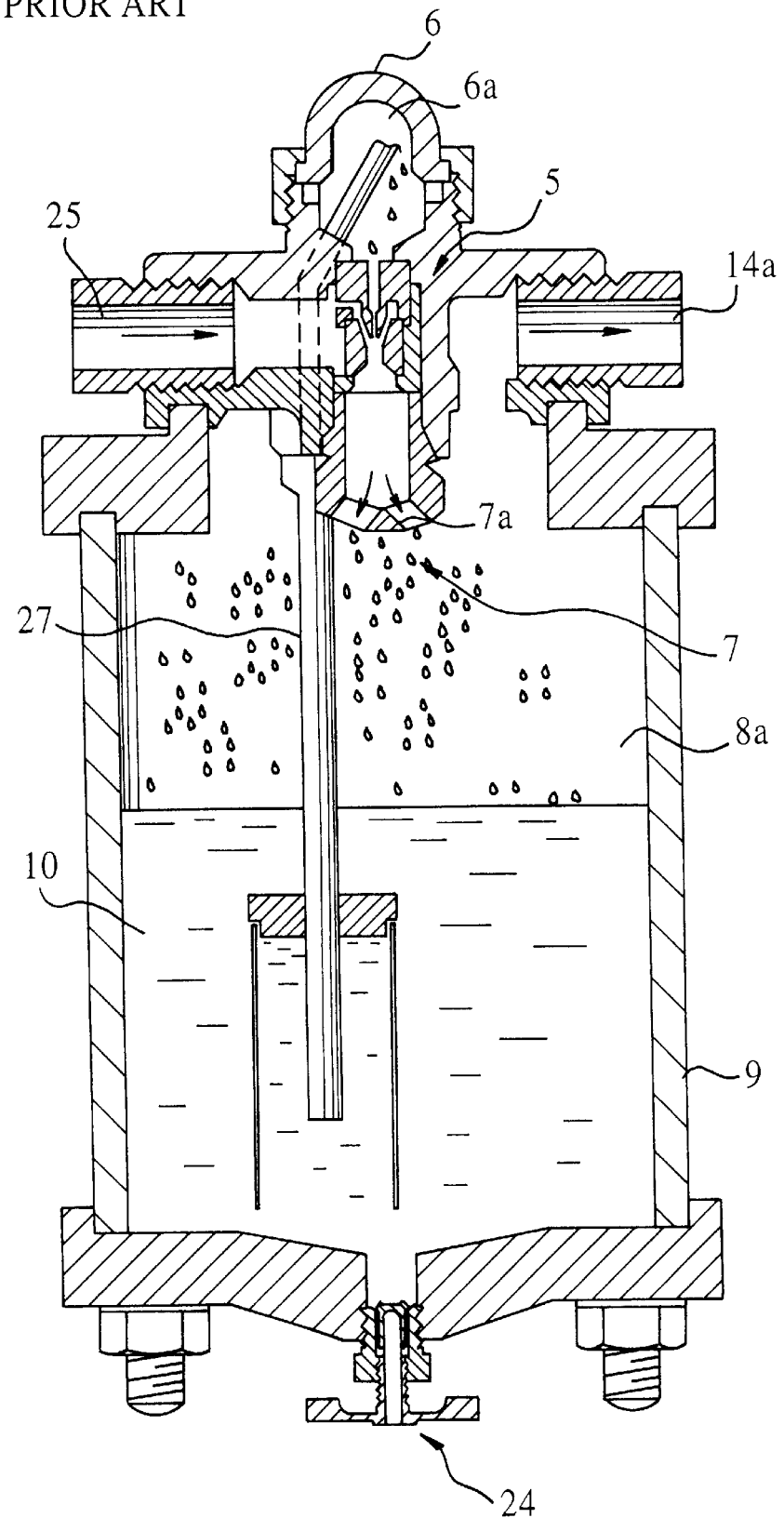
FIG. 4 is a longitudinal section of another conventional lubricant atomizer.
Figure 6:
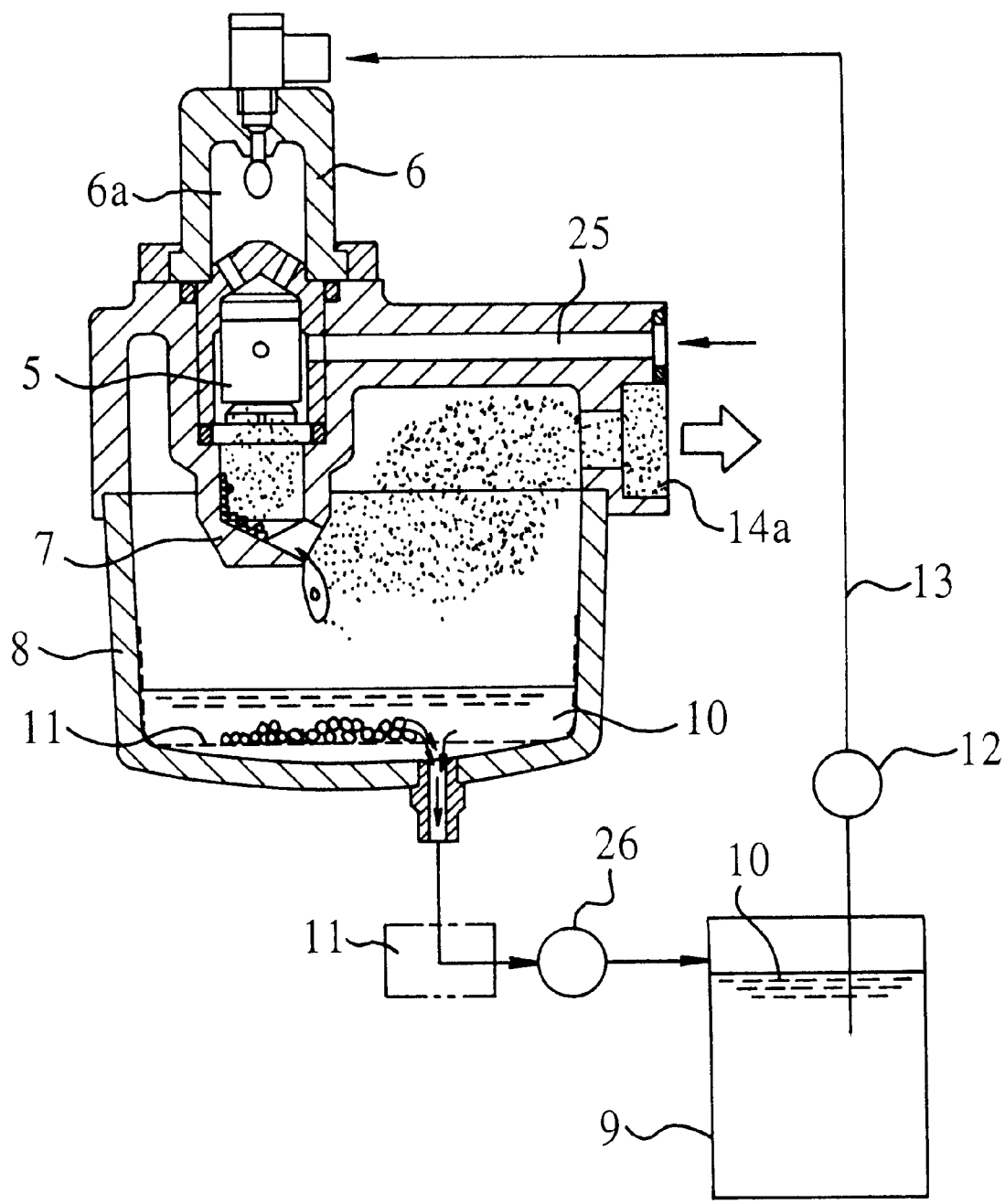
FIG. 6 illustrates still another conventional lubricant atomizer.
Figure 7:
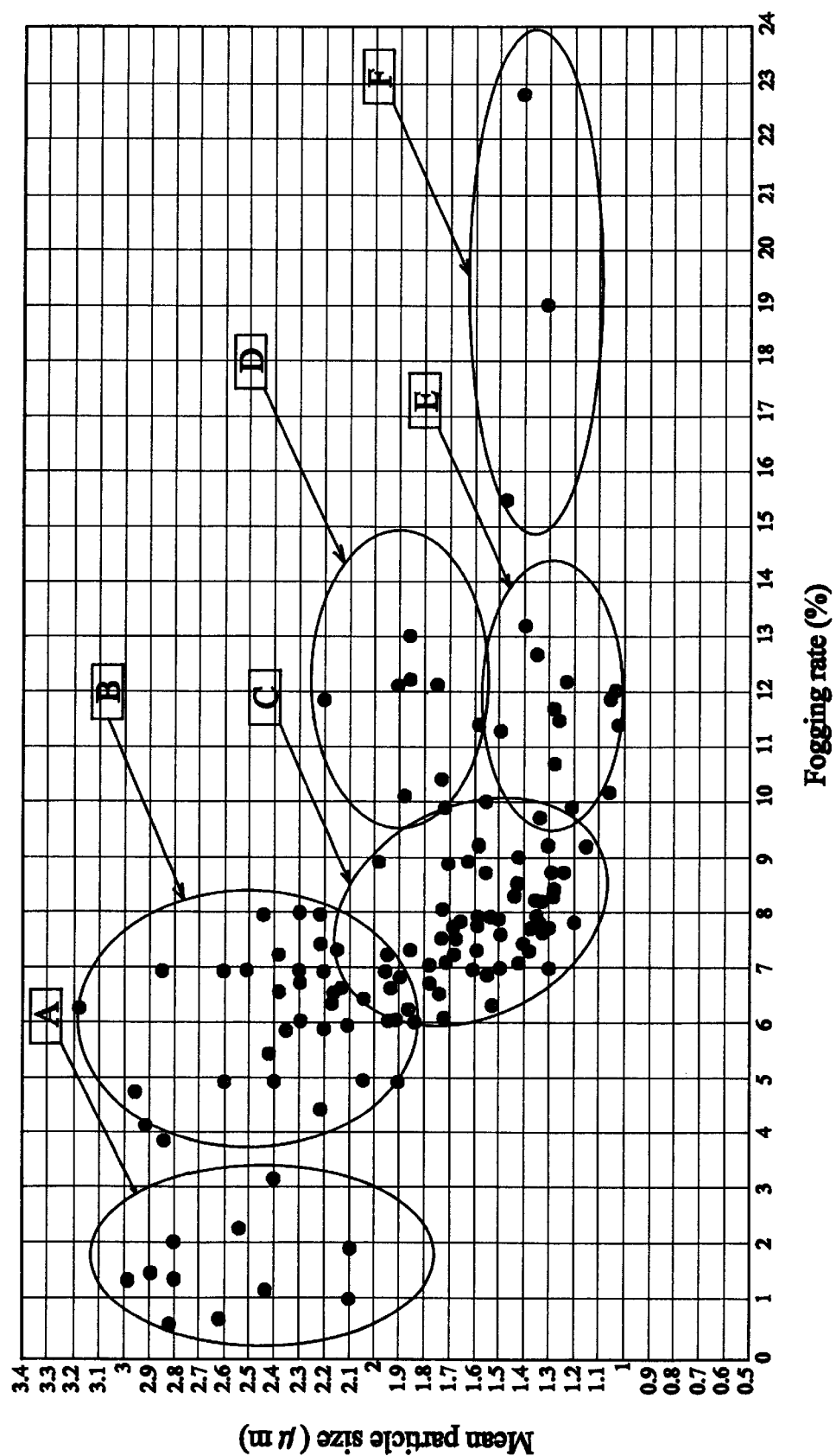
FIG. 7 shows how mean particle size of atomized lubricant is related with the fogging rate.

Referring to FIGS. 1 and 2, a circulating type of constant-rated lubricant atomizer A comprises a compressed air valve 2 having two or more ports and two branch lines 3 and 4 on its downstream side, a sight dome 6, a pressurized oil vessel 8 integrally connected to the sight dome 6 with an intervening Venturi mechanism 5 fixed therebetween, and a constant lubricant oil supplying pump 12. The compressed air valve 2 is supplied with compressed air, which is provided by filtering, compressing and pressure-controlling air. Specifically, compressed air from a compressed air supply is allowed to pass through a filter-and-regulator 1, which controls the compressed air to be at a desired pressure MPa. One of the two branch lines of the compressed air valve 2 is connected to the Venturi mechanism 5, and the other branch line is connected to the constant lubricant oil supplying pump 12.

The filtrated, pressure-controlled compressed air is made to flow into the pressurized oil vessel 8 via the Venturi mechanism 5, thereby applying a negative pressure to the sight dome 6. Specifically, the compressed air flows in the branch line 3, and it passes through the narrow passage of the Venturi body 5c, causing the compressed air to flow at an increased speed. Thus, the air is drawn from the sight dome 6 to apply a negative pressure in the inner space 6a of the sight dome 6.

The constant lubricant supplying pump 12 is supplied with compressed air, which flows in the other branch line 4 of the compressed air valve 2. The constant lubricant supplying pump 12 drives the lubricant oil 10 from an oil vessel 9 to the sight dome 6 via an associated constant lubricant supplying conduit 13, allowing the lubricant to fall in the center of the Venturi body 5c in the form of droplets. One example of such constant lubricant supplying pump 12a is a plunger pump which can work through the on/off operation of an associated three-ported electromagnetic valve 12b.

The plunger pump 12a draws a constant amount of lubricant from the oil vessel 9 via an associated filter 11 to supply the filtrated lubricant to the sight dome 6 via the constant lubricant supplying conduit 13.

Then, the compressed air flowing in the Venturi body 5c is mixed with lubricant droplets to form the fog of atomized lubricant in the pressurized oil vessel 8. When atomizing the lubricant into the pressurized oil vessel 8, lubricant droplets of relatively large size strike against fog condensing means in the form of an interference object, thereby allowing the atomized lubricant to condense into lubricant droplets, falling on the bottom of the pressured oil vessel 8. Specifically lubricant particles of relatively large size in the fog are allowed to condense on the fog interference 7, which is formed on the bottom part of the Venturi mechanism 5. The so condensed lubricant droplets fall from the interference 7 to be deposited on the bottom of the pressurized vessel 8. Another example of fog interference 7 is a coiled tube in which the atomized lubricant spirals down while condensing on the inner surface of the spiral tube.

After passing through such fog condensing means the fog spreads in the atomized and condensed lubricant coexistent space 8a of the pressurized vessel 8, allowing lubricant particles of increased size in the fog to fall downward.

The lubricant 10a thus deposited on the bottom of the pressurized vessel 8 is drawn to the lubricant fed-back space 5b defined in the Venturi mechanism 5 via a lubricant circulating conduit 15, a metal orifice 16 and an upper passage 5d of the Venturi body 5c in the order named by making use of the negative pressure in the Venturi holder 5a. Thus, the atomization is permitted to continue.

The metal orifice 16 is so sized that an adequate quantity of lubricant may flow into the Venturi mechanism depending on its sucking capacity. The metal orifice 16 may be replaced by a small-sized tube. The circulation of lubricant from the bottom to top of the pressurized vessel 8 via the lubricant circulating conduit 15, the upper passage 5d and the center of the Venturi body 5c, reduces the waste of lubricant to minimum (see FIG. 2).

The lubricant fed-back space 5b is defined by the top plate of the Venturi holder 5a. The top plate has plural through holes 5a1 made therein, allowing the lubricant to drop down from the inner space 6a of the sight dome 6 to the lubricant fed-back space 5b, joining with the circulated lubricant to be directed together to the center of the Venturi body 5c for atomization. Thus, the whole quantity of lubricant supplied via the constant lubricant supplying conduit 13 can be completely atomized and ejected on the secondary side irrespective of the working conditions of the fog generator B and the fogging rate inherent to the lubricant used. So far as the Venturi mechanism 5 works normally, therefore, the quantity per unit time of the lubricant to be ejected from the atomizer (absolute quantity of lubricant ejection) is equal to the quantity per unit time of the lubricant to be fed by the constant lubricant supplying pump 12. Optical sensors may be used to watch the falling of lubricant droplets in the sight dome 6, thereby making a decision as to whether or not the constant lubricant-supplying pump works in normal condition.

As best seen in FIG. 2, the through holes 5a1 are inclined toward the center of the Venturi body 5c, thereby assuring that the lubricant drops from the inner space 6a of the sight dome 6 exactly to the center of the Venturi body 5c in the lubricant fed-back space 5b.

As described earlier, the quantity of lubricant remaining after atomization is circulated via the lubricant circulating conduit 15, the metal orifice 16 and the upper passage 5d of the Venturi mechanism 5. Thus, the circulation is permitted to continue so far as the lubricant remains on the bottom of the pressurized vessel 8.

Atomized lubricant particles of very small size are selectively carried from the atomized and condensed lubricant coexistent space 8a of the pressurized vessel 8 by compressed air to be ejected from the fog outlet 14a.

In the lubricant atomizing method according to the present invention the flowing of the compressed air in the Venturi body 5c causes a negative pressure to be applied to the inside space 6a of the sight dome 6, thereby drawing the lubricant remaining on the bottom of the pressurized vessel 8 to the lubricant fed-back space 5b via the lubricant circulating conduit 15 to return to the center of the Venturi body 5c. Thus, atomization of lubricant is continued in the circulating way so long as lubricant remains in the pressurized vessel 8. This allows the fogging rate to be stable irrespective of the kinds of lubricant used and the working conditions of the atomizer.

Also advantageously, the suction power of the Venturi mechanism 5 and the fogging capability, if lowered, can be detected at an early stage; the lowering of the suction power and/or fogging capability will start precipitation of lubricant on the bottom of the pressurized vessel 8.

Precipitation of lubricant on the bottom of the pressurized vessel 8 can be easily detected by using a transparent pressurized vessel 8 or by using an oil level switch 18. Thus, the lowering of the suction power of the Venturi mechanism 5 can be detected by sight in terms of the quantity of lubricant precipitated on the bottom of the pressurized vessel 8.

Again referring to FIGS. 1 and 2, the filter-and-regulator 1 filters compressed air to control the filtrated compressed air at a desired pressure MPa. The compressed air switching valve 2 may be an electromagnetic valve having two ports for effecting on-and-off action on the filtrated compressed air. The fog generator B communicates with the compressed air switching valve 2 via the branch line 3, and the constant lubricant supplying pump 12 is connected to the compressed air switching valve 2 via the branch line 4. The fog generator B includes the pressurized vessel 8, the sight dome 6, the Venturi mechanism 5, the oil level switch 18 and the lubricant circulating conduit 15.

As seen from FIG. 2, the Venturi mechanism 5 is made up by the Venturi holder 5a and the Venturi body 5c. The inner space 6a of the sight dome 6 communicates the lubricant fed-back space 5b via the oblique through holes 5a1 of the Venturi holder 5a. The lubricant circulating conduit 15 is connected to the upper passage 5d of the Venturi holder 5a, and the upper passage 5d opens at the lubricant fed-back space 5b.

The plunger pump 12a is connected to the oil vessel 9, and the three-ported electromagnetic valve 12b is connected to the compressed air switching valve 2 via the branch line 4. The plunger pump 12a is put in operation when supplied with compressed air via the electromagnetic valve 12b, thus drawing a constant quantity of filtrated lubricant from the oil tank 9 via the associated filter 11, thus supplying the lubricant to the sight dome 6 via the constant lubricant supplying conduit 13.

The quantity of lubricant precipitated on the bottom of the pressurized vessel 8 can be measured in terms of the floating level of the level switch 18, thereby permitting the clogging of the Venturi body 5a to be detected at an early stage.

A compressed air bypass regulator needle 19 is connected to the Venturi mechanism 5 on its downstream side to allow a controlled amount of compressed air to flow into the bypass line. The pressure of compressed air thus introduced in the bypass line is so raised that contaminant particles, cutting liquid, cooling water or any other foreign substance from an object to be lubricated may be prevented from invading in the atomized lubricant conveying line 14.

The circulating type of constant-rated lubricant atomizer A may be modified as for instance follows: if a lubricant used is difficult to be atomized in the Venturi mechanism 5 or if the fogging capability of the Venturi mechanism is lowered, the lubricant precipitated on the bottom of the pressurized vessel 8 increases, informing that the prescribed working conditions are getting worse. This situation requires utmost concern. To meet such requirement warning can be given in terms of the quantity of precipitated lubricant on the bottom of the pressurized vessel by using a transparent pressurized vessel having a warning level marked on its surface or by using the oil level switch 18 to warn that something is wrong with the fog generator B.

The pressurized vessel 8 has a drain valve 20 fixed to its bottom. When a warning is given, it is necessary to drain all the remaining lubricant from the pressurized vessel 8 by opening the drain valve 20 before checking the cause for such trouble.

The sight dome 6 may be equipped with a sensor (not shown), which is so positioned that it may monitor the dropping of lubricant in the inner space 6a of the sight dome 6 before the lubricant rising in the constant lubricant supplying conduit 13 joins the lubricant rising in the lubricant circulating conduit 15. Thus, the working condition of the constant-rated lubricant supplying pump 12 can be checked.

As may be understood from the above, the flowing of the compressed air in the Venturi body causes a negative pressure to be applied to the inside space of the sight dome, thereby drawing the lubricant precipitated on the bottom of the pressurized vessel to the lubricant fed-back space via the lubricant circulating conduit to return to the center of the Venturi body. Thus, atomization of lubricant is allowed to continue in circulating way so long as lubricant remains on the bottom of the pressurized vessel.

The lubricant which is raised from the bottom of the pressurized vessel to be fed back to the lubricant fed-back space can be atomized completely, thus making it unnecessary to determine the quantity of lubricant in the lubricant circulating line in making a decision as to whether or not the lubricant atomizer works normally. Advantageously no return pipe to the oil vessel is required, and only a single pump is required.

The lubricant atomizer can work in stable condition no matter what kinds of lubricant may be used or no matter how different working conditions may be. The lubricant atomizer is simple in structure, and can be mass-produced, and accordingly can be less expensive.

What is claimed is:

1. A method of atomizing lubricant at a constant rate in a lubricant atomizer comprising a compressed air valve having two or more ports and two branches on its downstream side, a sight dome, a pressurized oil vessel integrally connected to the sight dome with an intervening Venturi mechanism fixed therebetween, and a constant lubricant supplying pump, one of the two branches of the compressed air valve being connected to the Venturi mechanism, and the other branch being connected to the constant lubricant supplying pump, the method comprising the steps of;

supplying filtrated, pressure-controlled compressed air to the Venturi mechanism via one of the two branches of the compressed air valve and to the constant lubricant supplying pump via the other branch of the compressed air valve respectively, thus drawing the air from the sight dome while the compressed air is flowing in the Venturi mechanism;

supplying lubricant from the constant lubricant supplying pump to the sight dome via an associated constant lubricant supplying conduit, allowing the lubricant to fall in the center of the Venturi mechanism in the form of droplets;

mixing compressed air with lubricant droplets to form the fog of atomized lubricant in the pressurized oil vessel;

allowing atomized lubricant to condense into lubricant droplets in the atomized-and-condensed lubricant coexistent space of the pressurized oil vessel; and allowing the lubricant droplets to fall down on the bottom of the pressurized oil vessel while ejecting the fog of atomized lubricant from the pressurized oil vessel, characterized in that it further comprises the step of;

using the negative pressure provided by the Venturi mechanism to draw the lubricant remaining on the bottom of the pressurized oil vessel via an associated lubricant circulating conduit opening at the bottom of the pressurized oil vessel, thereby making lubricant to return to the lubricant fed-back space defined above the Venturi mechanism, thus permitting lubricant to be atomized continuously.

2. A method of atomizing lubricant at a constant rate in a lubricant atomizer according to claim 1, wherein lubricant is drawn from a bottom of an oil vessel via an associated filter after putting the constant lubricant supplying pump in operation by actuating an associated three-port electromagnetic valve, via which the compressed air is supplied from the other branch of the compressed air valve to the constant lubricant supplying pump; the Venturi mechanism comprises a Venturi body and an associated holder; a predetermined quantity of lubricant is supplied to the sight dome via the constant lubricant supplying conduit; the lubricant fed-back space is defined above the Venturi body in the Venturi holder, the Venturi holder having at least one through hole to allow lubricant to drop from the sight dome to the lubricant fed-back space; and the lubricant fed back to the lubricant fed-back space is joined with the lubricant falling down in the lubricant fed-back space.

3. A circulating type of constant lubricant atomizer characterized in that it comprises: an on-and-off compressed air valve having two or more ports and two branches on its downstream side, a sight dome, a pressurized oil vessel integrally connected to the sight dome with an intervening Venturi mechanism fixed therebetween, a constant lubricant oil supplying pump, one of the two branches of the compressed air valve being connected to the Venturi mechanism, and the other branch being connected to the constant lubricant oil supplying pump, and a lubricant circulating conduit opening at the bottom of the pressurized oil vessel, thereby making lubricant to return to the Venturi mechanism, thus permitting lubricant oil to be atomized continuously.

4. A circulating type of constant lubricant atomizer according to claim 3, wherein the Venturi mechanism comprises a Venturi body and an associated Venturi holder having one or more through holes; a lubricant fed-back space is defined above the Venturi body in the Venturi holder so that the lubricant fed-back space communicates with the sight dome via the through hole; and the lubricant circulating conduit is connected to the lubricant fed-back space via a passage formed at a level higher than the Venturi body.

5. A circulating type of constant lubricant atomizer according to claim 3, wherein the constant lubricant oil supplying pump comprises a plunger pump communicating with an oil vessel, and a three-ported electromagnetic valve connected to the on-and-off compressed air valve, thus permitting the plunger pump to work through the on-and-off operation of the electromagnetic valve, thereby drawing a predetermined quantity of lubricant from the oil vessel after being filtered by a lubricant filter provided in the oil vessel so that the sight dome may be supplied with the predetermined quantity of lubricant via the constant lubricant supplying conduit.

6. A circulating type of constant lubricant atomizer according to claim 3, wherein the pressurized oil vessel has a level switch and/or lubricant drain valve equipped therewith.

* * * * *